Patented Oct. 16, 1934

1,976,741

UNITED STATES PATENT OFFICE 1,976,741

PREPARATION OF PRODUCTS CONTAINING PECTIN

Robert C. Mithoff, Berkeley, Calif., assignor to Standard Oil Company of California, San Francisco, Calif., a corporation of Delaware No Drawing. Application January 16, 1932, Serial No. 587,158

8 Claims. (Cl. 99—11)

This invention relates to the art of treating cellulosic pectin-bearing materials for the extraction of pectin therefrom. The invention is particularly directed toward a method whereby products containing pectin, such as pectin solutions, may be obtained in a condition of greater purity and of higher pectin concentration than has hitherto been possible. Furthermore, the method of this invention gives rise to greater yields of pectin from cellulosic substances and the pectin-containing products resulting from the operation of this invention are substantially free from those constituents which normally impart objectionable colors, odors and/or tastes to pectin products.

The extraction of pectin from cellulosic substances such as apples, currents, plums, citrus fruit rind, etc., has been well developed heretofore. The cellulosic material may be treated with acid solutions so as to form a pectin extract, or with hot water. The acid digestion of cellulosic material for the extraction of pectin therefrom is the method most generally followed. Such acid extraction gives rise to extracts which contain appreciable quantities of coloring and flavoring substances. Furthermore, the heated acid solutions appear to slowly decompose and degrade the pectin so that relatively low yields are obtained. Because of the presence of the coloring and flavoring constituents in the extract, the acid extracts are generally dark in color and if such acid extractions are concentrated by evaporation and vacuum, the products have a pronounced and objectionable odor and flavor. Such acid extracts are either concentrated so as to form concentrated solutions containing pectin, or they are evaporated to dryness so as to produce a solid or comminuted product. If desired, the acid solutions may be treated with ethyl alcohol or acetone, precipitating the pectin which may then be filtered off, washed, dried and ground.

This invention is particularly directed toward a preliminary treatment of the cellulosic material prior to extraction, which extraction may be carried out in any suitable or desirable manner. By primarily treating the cellulosic material for the removal of coloring and flavoring substances, extracts of higher purity and concentration may be obtained.

More specifically, this invention is based upon the discovery that certain specific alcohols such as tertiary butyl alcohol, are capable of extracting objectionable constituents from pectin-containing materials without degrading, decomposing, or otherwise deleteriously affecting the pectin. Furthermore, it has been found that a preliminary purification of the pectin-bearing material by treatment with an alcohol of the character stated, leaves the residual pectin-bearing material in a more susceptible condition for the subsequent extraction of the pectin.

Accordingly, it is an object of this invention to disclose and provide a method of treating pectin-bearing materials which permits the production of greater yields of pectin.

Another object of this invention is to disclose and provide a method whereby pectin solutions or pectin products of greater purity may be obtained.

A further object of this invention is to disclose and provide a method of preparing pectin or pectin products which are substantially free from constituents which impart objectionable colors, odors and tastes.

Another object of this invention is to disclose and provide a process of treating cellulosic substances containing pectin for the economical extraction of pectin therefrom.

A still further object of this invention is to disclose and provide a method of treating pectin-containing cellulosic materials with tertiary butyl alcohol for the purpose of extracting coloring and flavoring and odor-imparting substances therefrom prior to the extraction of pectin.

These and other objects, uses and advantages of this invention will become apparent to those skilled in the art from the following detailed description of a preferred manner of carrying out the method of this invention.

As stated hereinbefore, this invention is based upon the discovery that while pectin is substantially insoluble in aqueous solutions of certain alcohols, the objectionable coloring and flavoring matter are soluble therein. It has been found, for example, that tertiary butyl alcohol is particularly suitable for a preliminary purification of pectin-bearing materials. When tertiary butyl alcohol is employed, the solution should contain more than about 30% by volume of the tertiary butyl alcohol.

The method of this invention may be applied to any material containing pectin such as, for example, apple pomace, citrus fruit peel, plums, currants, cranberries, etc. If it is desired to extract pectin from apples, for example, the apples may be subjected to pressure to extract most of the juice and the resulting apple pomace then mixed with a suitable volume of tertiary butyl alcohol solution. It has been found that the aqueous solution of tertiary butyl alcohol should contain more than 30% by volume of the alcohol so as to prevent any pectin from going into solution during the extraction of the objectionable constituents.

The mixture of pomace and tertiary butyl alcohol may be allowed to stand at atmospheric temperature, or preferably the mixture is heated to a temperature of from about 140° F. to 190° F. for a period of 1 or 2 hours. The resulting mass may then be filtered or the solids separated from the liquid phase of the mixture in any other suitable manner. The alcoholic extract will generally be dark in color, indicating the removal of a considerable amount of coloring matter. The residual pulp is preferably washed with cold water and again filtered. Such washed pulp may then be subjected to any of the well known pectin extraction processes such as, for example, an extraction with tartaric, citric, hydrochloric or lactic acid solution. The resulting pectin extract may then be concentrated or evaporated, or the pectin removed therefrom as a precipitate by any suitable method. It will be found that the pectin extract thus produced will be of light color and will give rise to a pectin of higher jelly grade than that normally obtained.

As a specific example of the process in comparison with an ordinary extraction process, reference is made to the following:

400 grams of apple pomace were heated to 190° F. for 1 hour with 800 c. c. of distilled water and 2 grams of tartaric acid. The pulp was then filtered through a cloth and the pressed pulp then washed with 200 c. c. of distilled water and again filtered. The washings were added to the first filtrate and this acid extract was clarified by filtration through paper, employing a filter-aid. The resulting solution was concentrated by evaporating it to 150 c. c. under a pressure of about 50 mm. of mercury absolute. The resulting concentrated pectin solution was a reddish viscous liquid strongly smelling of apples. Upon standing, white crystals separated from it. Its jelly grade was determined according to the method described by C. P. Wilson, Ind. Eng. Chem. Vol. 20, pages 1305–1306 (1928). The test jelly grade was found to be 3½. The method described by C. P. Wilson was varied in that the jellies were allowed to cool over night in cylindrical containers 5 centimeters in diameter. A jelly was considered satisfactory if after 18 hours standing in these containers it would support motionless a $\frac{1}{16}$ inch steel ball-bearing forced down in the center of the jelly mass. The jelly grade of the pectin was taken as that of a jelly which would just support the weight of the ball and is expressed as the ratio of the weight of sugar used to the weight of pectin extract used.

In comparison with the above example, 400 grams of identical apple pomace were heated to 170° F. for 2 hours with 1000 c. c. of 60% by volume tertiary butyl alcohol solution. The resulting mass was filtered through cloth, washed with 300 c. c. of cold water, and again filtered. The alcoholic extract was dark in color, indicating the removal of some coloring matter. The pulp which resulted from this operation was subjected to exactly the same treatment as that described hereinabove, namely, it was heated with a tartaric acid solution, filtered, washed, etc. The resulting 150 cc. of extract was a reddish liquid much lighter in color than the product from the previous example. It was much more viscous and was practically odorless. Its jelly grade was 4½.

Jellies made from the pectin extract obtained by the treatment of pomace preliminarily purified with the tertiary butyl alcohol, were much lighter in color than those made with the first mentioned pectin extract and had no odor of apples whereas the jellies made from pectin extract obtained from untreated apple pomace exhibited an appreciable apple odor.

In addition, it has been found that the heating of apple pomace or other cellulosic pectin-bearing materials in the presence of tertiary butyl alcohol solutions, does not decompose the pectin contained in the material nor will it dissolve the pectin. Furthermore, the preliminary alcoholic purification of the pectin-bearing material appears to facilitate the subsequent extraction with a heated acid solution. As a result, a much more concentrated acid pectin extract may be obtained whenever the cellulosic material is preliminarily purified with tertiary butyl alcohol.

It will be apparent to those skilled in the art that numerous changes and modifications may be made without departing from the invention. The purification process may be carried out either at atmospheric or superatmospheric temperatures and concentration of alcohol in the aqueous solution employed is not critical although it is desirable to maintain over 30% by volume of alcohol in the solution. Any desired method of bringing the cellulosic material into contact with the alcohol may be utilized. In treating materials such as, for example, citrus fruit peels, it is desirable that the peeling be shredded or sliced so as to permit the alcohol to more readily act thereon.

These and all other changes and modifications coming within the scope of the appended claims are embraced thereby.

I claim:

1. In a process of treating materials containing pectin and coloring and flavoring substances, the step of purifying the pectin-bearing materials for the extraction of coloring and flavoring substances therefrom prior to the extraction of pectin by contacting the pectin-bearing material with tertiary butyl alcohol at a temperature of about 140° F.–190° F., and then separating the alcohol and substances in solution therein from the pectin-bearing material.

2. In a process of treating materials containing pectin and coloring and flavoring substances, the step of purifying the pectin-bearing materials for the extraction of coloring and flavoring substances therefrom prior to the extraction of pectin by contacting the pectin-bearing material with hot tertiary butyl alcohol, then separating the alcohol and substances in solution therein from the pectin-bearing material, and finally extracting pectin from the purified pectin-bearing material.

3. In a process of treating materials containing pectin and coloring and flavoring substances, the step of purifying the pectin-bearing materials for the extraction of coloring and flavoring substances therefrom prior to the extraction of pectin by contacting the pectin-bearing material with diluted tertiary butyl alcohol at a temperature of between 140° F. and 190° F., then separating the alcohol and substances in solution therein from the pectin-bearing material, then washing the pectin-bearing material, and finally extracting pectin from the purified pectin-bearing material.

4. In a process of treating materials containing pectin and coloring and flavoring substances, the step of purifying the pectin-bearing materials for the extraction of coloring and flavoring substances therefrom prior to the extraction of pectin by contacting the pectin-bearing material with a hot aqueous solution of tertiary butyl alcohol, and then separating the alcohol solution and substances extracted thereby from the pectin-bearing material.

5. In a process of treating materials containing pectin and coloring and flavoring substances, the step of purifying the pectin-bearing materials for the extraction of coloring and flavoring substances therefrom prior to the extraction of pectin by contacting the pectin-bearing material with diluted tertiary butyl alcohol at a superatmospheric temperature, and then separating the alcohol and substances in solution therein from the pectin-bearing material.

6. In a process of treating materials containing pectin and coloring and flavoring substances, the step of purifying the pectin-bearing materials for the extraction of coloring and flavoring substances therefrom prior to the extraction of pectin by contacting the pectin-bearing material with a hot aqueous solution of tertiary butyl alcohol containing more than 30% by volume of tertiary butyl alcohol, and then separating the alcohol and substances in solution therein from the pectin-bearing material.

7. In a process of treating materials containing pectin and coloring and flavoring substances, the step of purifying the pectin-bearing materials for the extraction of coloring and flavoring substances therefrom prior to the extraction of pectin by contacting the pectin-bearing material with an aqueous solution of tertiary butyl alcohol containing more than 30% by volume of tertiary butyl alcohol at a superatmospheric temperature, and then separating the alcohol and substances in solution therein from the pectin-bearing material.

8. In a process of treating materials containing pectin and coloring and flavoring substances, the step of purifying the pectin-bearing materials for the extraction of coloring and flavoring substances therefrom prior to the extraction of pectin by contacting the pectin-bearing material with an aqueous solution of tertiary butyl alcohol containing more than 30% by volume of tertiary butyl alcohol at a temperature of between 140° F. and 190° F., and then separating the alcohol and substances in solution therein from the pectin-bearing material.

ROBERT C. MITHOFF.